(12) United States Patent
Shirasaka et al.

(10) Patent No.: US 8,081,153 B2
(45) Date of Patent: Dec. 20, 2011

(54) LIQUID CRYSTAL DISPLAY DEVICE AND VIDEO DISPLAY DEVICE

(75) Inventors: Yasuhiro Shirasaka, Kanagawa (JP); Kazuya Ueda, Kanagawa (JP); Hirohide Fukumoto, Kumamoto (JP); Hisashi Kadota, Kanagawa (JP)

(73) Assignee: Sony Corporation, Tokyo (JP)

( * ) Notice: Subject to any disclaimer, the term of this patent is extended or adjusted under 35 U.S.C. 154(b) by 859 days.

(21) Appl. No.: 11/893,441

(22) Filed: Aug. 16, 2007

(65) Prior Publication Data

US 2008/0055529 A1 Mar. 6, 2008

(30) Foreign Application Priority Data

Aug. 30, 2006 (JP) .................. P2006-233909

(51) Int. Cl.
G09G 3/36 (2006.01)
(52) U.S. Cl. .................. 345/100; 345/103
(58) Field of Classification Search .............. 345/87, 345/100, 101, 103; 349/141–144
See application file for complete search history.

(56) References Cited

U.S. PATENT DOCUMENTS

| | | | | |
|---|---|---|---|---|
| 4,582,395 | A * | 4/1986 | Morozumi | 349/43 |
| 5,748,275 | A * | 5/1998 | Sato et al. | 349/144 |
| 6,335,776 | B1 * | 1/2002 | Kim et al. | 349/129 |
| 2002/0109815 | A1 * | 8/2002 | Hirakata et al. | 349/155 |
| 2004/0263735 | A1 * | 12/2004 | Kitson et al. | 349/123 |
| 2006/0145978 | A1 * | 7/2006 | Takatori et al. | 345/87 |

FOREIGN PATENT DOCUMENTS

| | | |
|---|---|---|
| JP | 01-293317 | 11/1989 |
| JP | 10-260406 | 11/1989 |
| JP | 02-236589 | 9/1990 |
| JP | 03-152512 | 6/1991 |
| JP | 04-086812 | 3/1992 |
| JP | 04-125617 | 4/1992 |
| JP | 06-289408 | 10/1994 |
| JP | 08-201830 | 8/1996 |
| JP | 09-054325 | 2/1997 |
| JP | 10-177177 | 6/1998 |
| JP | 2000-338510 | 12/2000 |
| JP | 2002-196355 | 7/2002 |
| JP | 2005-078048 | 3/2005 |
| JP | 2006-047613 | 2/2006 |
| JP | 2007-316119 | 12/2007 |

* cited by examiner

*Primary Examiner* — Quan-Zhen Wang
*Assistant Examiner* — Calvin C Ma
(74) *Attorney, Agent, or Firm* — Robert J. Depke; Rockey, Depke & Lyons, LLC

(57) ABSTRACT

Disclosed herein is a liquid crystal display device. The liquid crystal display device includes: a first substrate; a second substrate; a liquid crystal layer; a first electrode part; and a second electrode part. The first electrode part includes a pixel electrode formed in the pixel area and a peripheral electrode formed in the peripheral area. The second electrode part includes a pixel electrode part formed in the pixel area and a peripheral electrode formed in the peripheral area. The peripheral electrode of at least one of the first electrode part and the second electrode part is formed by a plurality of electrodes adjacent to each other. Voltage values of driving voltages applied to the respective electrodes adjacent to each other of the peripheral electrode are different from each other.

18 Claims, 10 Drawing Sheets

LIQUID CRYSTAL DISPLAY DEVICE AND VIDEO DISPLAY DEVICE

CROSS REFERENCES TO RELATED APPLICATIONS

The present invention contains subject matter related to Japanese Patent Application JP 2006-233909 filed with the Japan Patent Office on Aug. 30, 2006, the entire contents of which being incorporated herein by reference.

BACKGROUND OF THE INVENTION

1. Field of the Invention

The present invention relates to a liquid crystal display device and a video display device, and particularly to a liquid crystal display device and a video display device having a liquid crystal panel that can suppress degradation in display characteristics in the liquid crystal panel.

2. Description of the Related Art

A projection type video display device such as a liquid crystal projector or the like separates light emitted from a light source into red, green, and blue, modulates the pieces of color light by three light valves formed by a liquid crystal display element, synthesizes color luminous fluxes after the modulation, and then enlarges and projects resulting light onto a projection surface.

Such a video display device has recently been desired to have higher luminance and longer life. In order to achieve both higher luminance and longer life, a liquid crystal display element using an alignment film formed by an inorganic material that is not degraded under intense light has been applied.

A liquid crystal panel for forming the video display device is formed by interposing a liquid crystal layer between a first substrate and a second substrate arranged so as to face each other. A common electrode is provided on an opposed surface side of a pixel area (effective pixel area) of the first substrate and on the entire surface of an opposed surface side of the second substrate.

The electrodes are covered by respective alignment films. These alignment films control the state of alignment of liquid crystal molecules included in the liquid crystal layer.

Further, a gap between the first substrate and the second substrate is sealed by a seal material provided in a peripheral area around the pixel area, so that the liquid crystal layer is filled and sealed in between the first substrate and the second substrate.

It is known that an ionic impurity mixed in at a time of injection of the liquid crystal or eluted from the seal material surrounding the liquid crystal layer in the liquid crystal panel formed as described above is diffused into the pixel area and aggregated by the subsequent driving of the liquid crystal display device, so that display characteristics of the liquid crystal panel are degraded.

Accordingly display devices of various constitutions intended to suppress degradation in such display characteristics have been proposed.

For example, Japanese Patent Laid-Open No. Hei 10-260406 (hereinafter referred to as Patent Document 1) proposes the following. A display device in which using surface modification by ultraviolet-ray irradiation, the surface energy of an alignment film situated in a peripheral area is set higher than the surface energy of an alignment film in a pixel area situated in a central part of a liquid crystal panel, so that an ionic impurity eluted from a seal material is adsorbed and captured in the alignment film part of the peripheral area having higher surface energy and thereby diffusion of the ionic impurity into the pixel area is suppressed.

In addition, Japanese Patent Laid-Open No. Hei 3-152512 proposes a display device in which a material having high ion adsorptivity is provided in a peripheral area to thereby suppress diffusion of an ionic impurity into a pixel area as in Patent Document 1.

Further, Japanese Patent Laid-Open No. Hei 10-177177 proposes a display device that has a barrier structure for preventing diffusion of an ionic impurity eluted from a seal material, in which structure a projection is provided between the seal material and a pixel area.

Further, a large number of display devices that have an ion trap electrode in a peripheral area to adsorb impurity ions electrically and thereby suppress the diffusion of the impurity ions have been proposed. See, Japanese Patent Laid-Open No. Hei 1-293317, Japanese Patent Laid-Open No. Hei 4-125617, Japanese Patent Laid-Open No. Hei 6-289408, Japanese Patent Laid-Open No. Hei 8-201830, Japanese Patent Laid-Open No. Hei 9-54325, Japanese Patent Laid-Open No. 2000-338510, Japanese Patent Laid-Open No. 2002-196355, Japanese Patent Laid-Open No. Hei 4-86812 (hereinafter referred to as Patent Document 11), and Japanese Patent Laid-Open No. 2006-47613 (hereinafter referred to as Patent Document 12).

SUMMARY OF THE INVENTION

However, with a technique for changing the state of the alignment film in the peripheral area, it is very difficult to control the state of the film.

The proposition to use a special material increases the number of manufacturing processes and is thus low in feasibility.

The proposition to provide a projection provides insufficient effect because it is difficult to completely keep away the impurity eluted in a liquid crystal.

On the other hand, the electric adsorption of an ionic impurity by an ion trap electrode has a certain degree of effect.

However, in a liquid crystal display device having an alignment film formed by an inorganic material meeting the needs for higher luminance and longer life of a projection type video display device, an ionic impurity generally tends to be adsorbed by the alignment film. Therefore it may not be said that only providing a simple electrode in the preceding example is sufficient to maintain excellent display.

It is desirable to provide a liquid crystal display device and a video display device that can suppress the effect of an ionic impurity within a liquid crystal cell, prevent display defects such as burn-in and the like, and in turn obtain higher image quality.

According to an embodiment of the present invention, there is provided a liquid crystal display device including: a first substrate including a pixel area and a peripheral area around the pixel area; a second substrate disposed so as to face the first substrate with a predetermined gap between the first substrate and the second substrate; a liquid crystal layer retained within the gap between the first substrate and the second substrate; a first electrode part formed on the first substrate; and a second electrode part formed on the second substrate. The first electrode part includes a pixel electrode formed in the pixel area and a peripheral electrode formed in the peripheral area. The second electrode part includes a pixel electrode part formed in the pixel area and a peripheral electrode formed in the peripheral area. The peripheral electrode of at least one of the first electrode part and the second electrode part is formed by a plurality of electrodes adjacent to each other, and voltage values of driving voltages applied to the respective electrodes adjacent to each other of the peripheral electrode are different from each other.

According to an embodiment of the present invention, there is provided a video display device including: a light source; at least one liquid crystal display device; a condensing optical system for leading light emitted from the light source to the liquid crystal display device; and a projection optical system for enlarging and projecting light resulting from light modulation by the liquid crystal display device. The liquid crystal display device includes a first substrate including a pixel area and a peripheral area around the pixel area, a second substrate disposed so as to face the first substrate with a predetermined gap between the first substrate and the second substrate, a liquid crystal layer retained within the gap between the first substrate and the second substrate, a first electrode part formed on the first substrate, and a second electrode part formed on the second substrate. The first electrode part includes a pixel electrode formed in the pixel area and a peripheral electrode formed in the peripheral area. The second electrode part includes a pixel electrode part formed in the pixel area and a peripheral electrode formed in the peripheral area. The peripheral electrode of at least one of the first electrode part and the second electrode part is formed by a plurality of electrodes adjacent to each other, and voltage values of driving voltages applied to the respective electrodes adjacent to each other of the peripheral electrode are different from each other.

According to an embodiment of the present invention, a plurality of electrodes are first provided in such a manner as to be adjacent to each other in a peripheral area, and potential between the adjacent electrodes is changed.

Thereby an electric field in a horizontal direction occurs, constituting a force that moves impurity ions in addition to a flow caused by the minute sway of a liquid crystal. Thus ions moving from a pixel area can be swiftly moved to the outside of the pixel area.

According to an embodiment of the present invention, it is possible to suppress the effect of an ionic impurity within a liquid crystal cell, prevent display defects such as burn-in and the like, and in turn obtain higher image quality.

DETAILED DESCRIPTION OF THE PREFERRED EMBODIMENT

A preferred embodiment of the present invention will hereinafter be described with reference to the drawings.

In the present embodiment, description will be made of characteristic constitution and functions of an active matrix type liquid crystal display device, and thereafter description will be made of general constitution and functions of a projection type liquid crystal display device (video display device) as a suitable electronic device to which the active matrix type liquid crystal display device is applied.

[Liquid Crystal Display Device]

Figure 1:
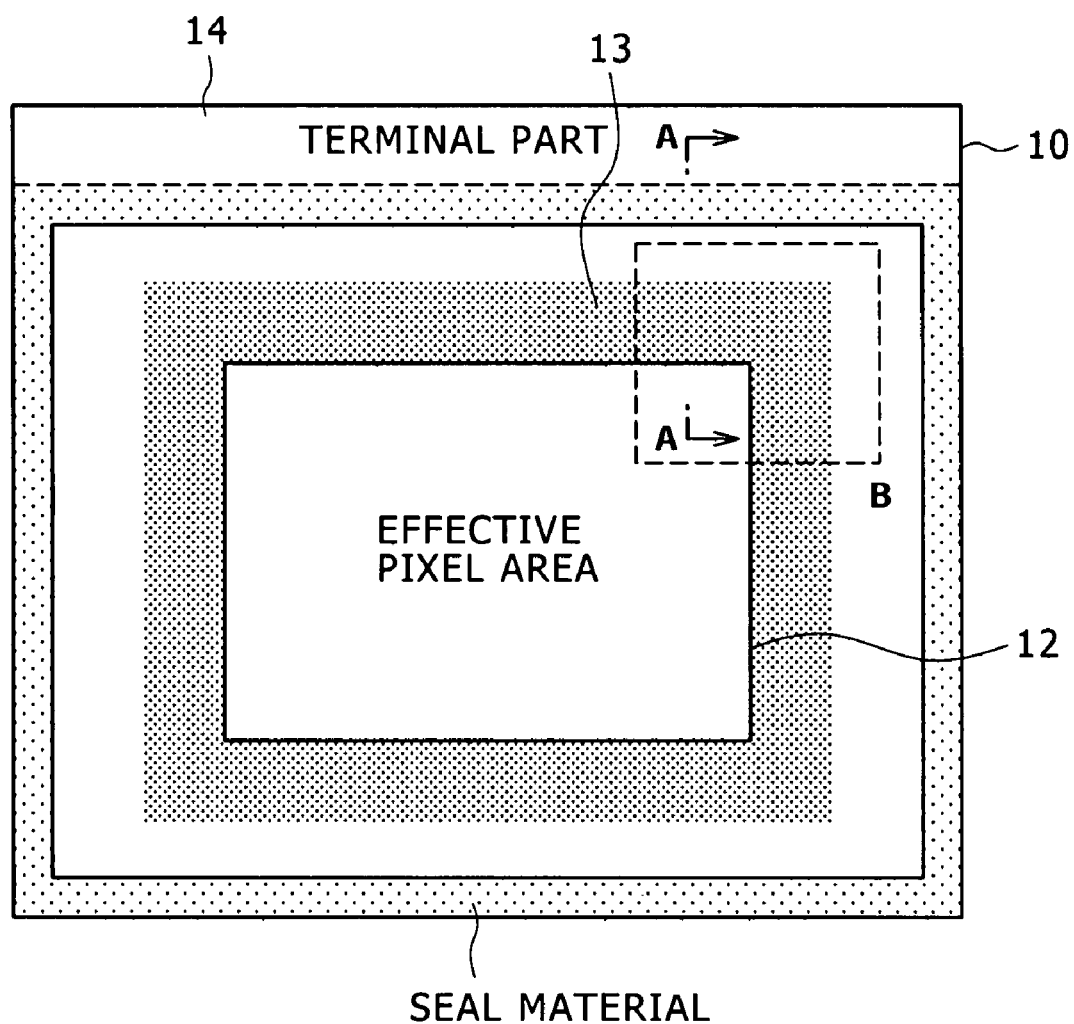
FIG. 1 is a plan view schematically showing a constitution of a liquid crystal display device according to the present embodiment.
Figure 2:
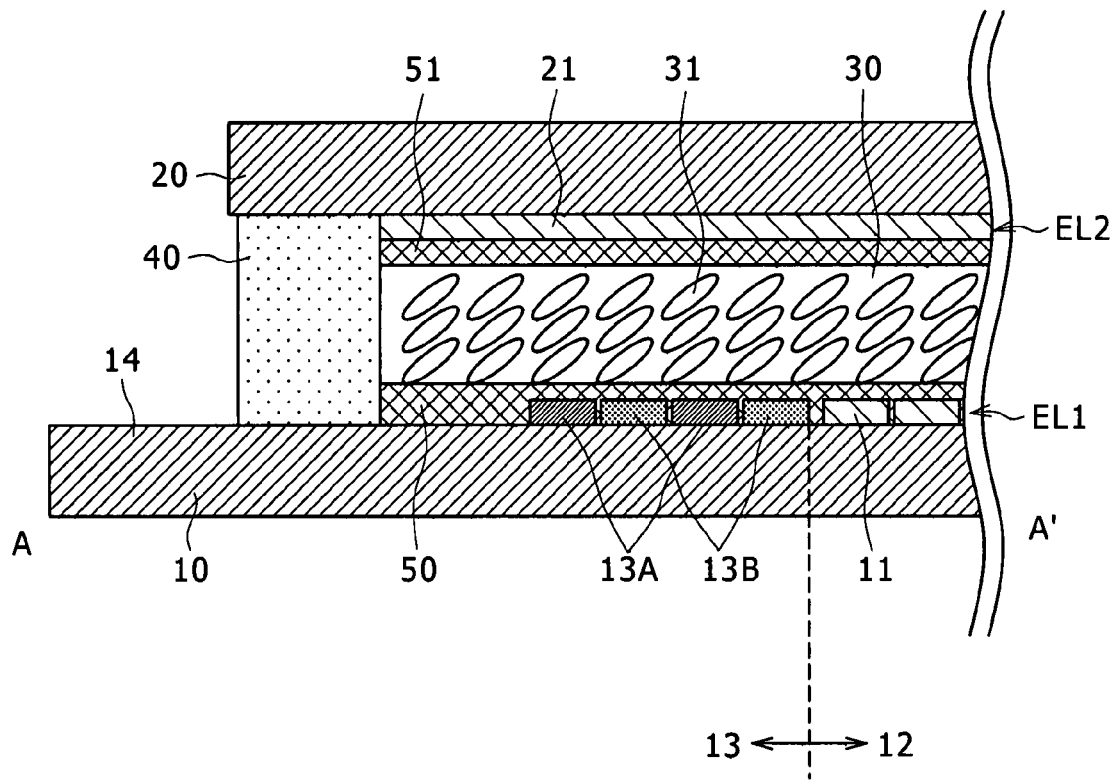
FIG. 2 is a sectional view taken along a line A-A' in FIG. 1.
Figure 3:
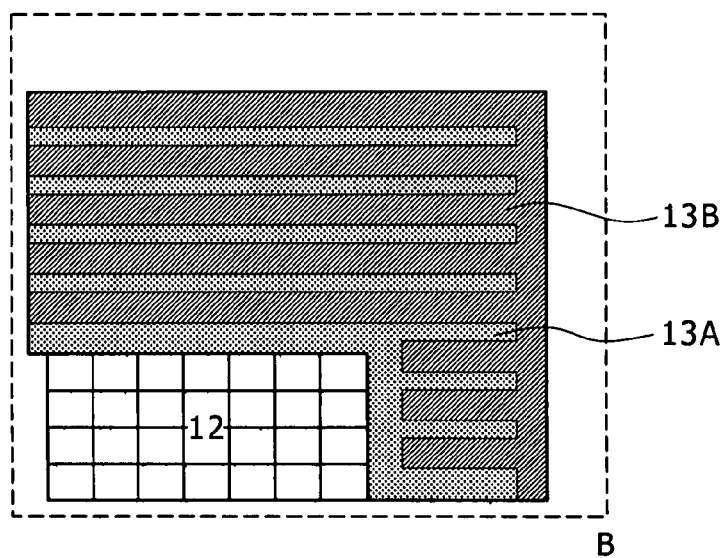
FIG. 3 is an enlarged plan view of a region B enclosed by a dotted line in FIG. 1.

FIG. 1 is a plan view of general constitution of a liquid crystal display device according to the present embodiment. FIG. 2 is a sectional view taken along a line A-A' in FIG. 1. FIG. 3 is an enlarged plan view of a region B enclosed by a dotted line in FIG. 1.

As shown in FIG. 2, the liquid crystal display device 1 according to the present embodiment has a TFT substrate (first substrate) 10 and a transparent counter substrate (second substrate) 20 disposed so as to be opposed (face) to the TFT substrate 10.

A liquid crystal 31 is sealed in between the TFT substrate 10 and the counter substrate 20 that are opposed to each other. The sealed-in liquid crystal 31 forms a liquid crystal layer 30 as a light modulating layer. The periphery of the liquid crystal layer 30 is enclosed by a seal material 40, and the pair of substrates opposed to each other is retained at a fixed interval by the seal material 40.

The TFT substrate 10 is formed by a light transmissive material such as quartz, glass, plastic, or the like.

A plurality of substantially rectangular pixel electrodes 11 formed by a transparent conductive film such as an ITO film (Indium Tin Oxide film) or the like are arranged in the form of a matrix on an inner surface side (opposed surface side) of the TFT substrate 10. The pixel electrodes 11 are formed in an effective pixel area (pixel area) 12. A plurality of peripheral electrodes 13A and 13B adjacent to each other are formed in a peripheral area 13 around the pixel area 12. An inorganic alignment film 50 made of an inorganic material is formed so as to cover the pixel electrodes 11 and the peripheral electrodes 13A and 13B.

The pixel electrodes 11 and the peripheral electrodes 13A and 13B formed on the TFT substrate 10 constitute a first electrode part EL1.

The counter substrate 20 is formed by a light transmissive material such as quartz, glass, plastic, or the like.

A common electrode 21 made of a transparent conductive film such as an ITO film or the like is formed on an inner surface side (opposed surface side) of the counter substrate 20. An inorganic alignment film 51 made of an inorganic material is formed so as to cover the common electrode 21.

That is, the common electrode 21 made on the counter substrate 20 is formed as one electrode common to the pixel area 12 and the peripheral area 13 which electrode is obtained by connecting a pixel electrode part in the pixel area 12 and a peripheral electrode in the peripheral area 13 with each other.

The common electrode 21 formed on the counter substrate 20 constitutes a second electrode part EL2.

In addition, as shown in FIG. 1, the effective pixel area 12 in which the pixel electrodes 11 and the like are formed is disposed at a central part of the TFT substrate 10. The peripheral area 13 is provided around the effective pixel area 12.

As shown in FIG. 2, the peripheral area 13 has the first peripheral electrode 13A and the second peripheral electrode 13B formed so as to be adjacent to each other.

Further, in the present embodiment, as shown in FIG. 3, the peripheral electrodes 13A and 13B are each formed by a plurality of electrodes extending in a horizontal direction. The plurality of electrodes are electrically connected to each other in each of the peripheral electrodes 13A and 13B. In other words, the peripheral electrodes 13A and 13B are formed into a comb-tooth shape in which one end is short-circuited as shown in FIG. 3.

Figure 4:
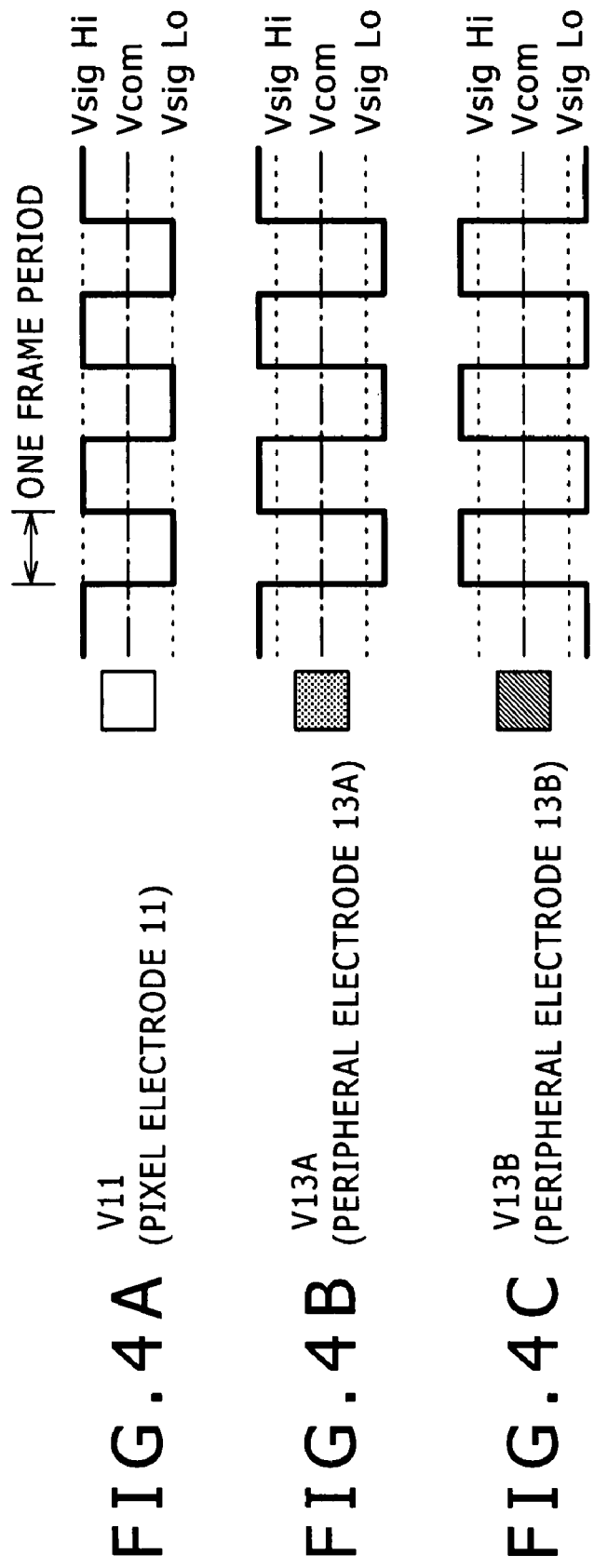
FIGS. 4A, 4B, and 4C are diagrams showing waveforms of driving voltages applied to a pixel electrode and a plurality of peripheral electrodes.

In such a constitution, rectangular-wave voltages as shown in FIGS. 4A to 4C are applied to the pixel electrodes 11 and the peripheral electrodes 13A and 13B. FIG. 4A shows a voltage V11 applied to the pixel electrodes 11. FIG. 4B shows a voltage V13A applied to the first peripheral electrode 13A. FIG. 4C shows a voltage V13B applied to the second peripheral electrode 13B.

The rectangular waves in FIGS. 4A to 4C are characterized in that the voltages applied to the peripheral electrodes 13A and 13B are higher than a voltage Vsig applied to the pixel electrodes 11, and in that the voltage V13A applied to the first peripheral electrode 13A and the voltage V13B applied to the second peripheral electrode 13B are opposite in phase (or polarity) to each other.

Figure 5:
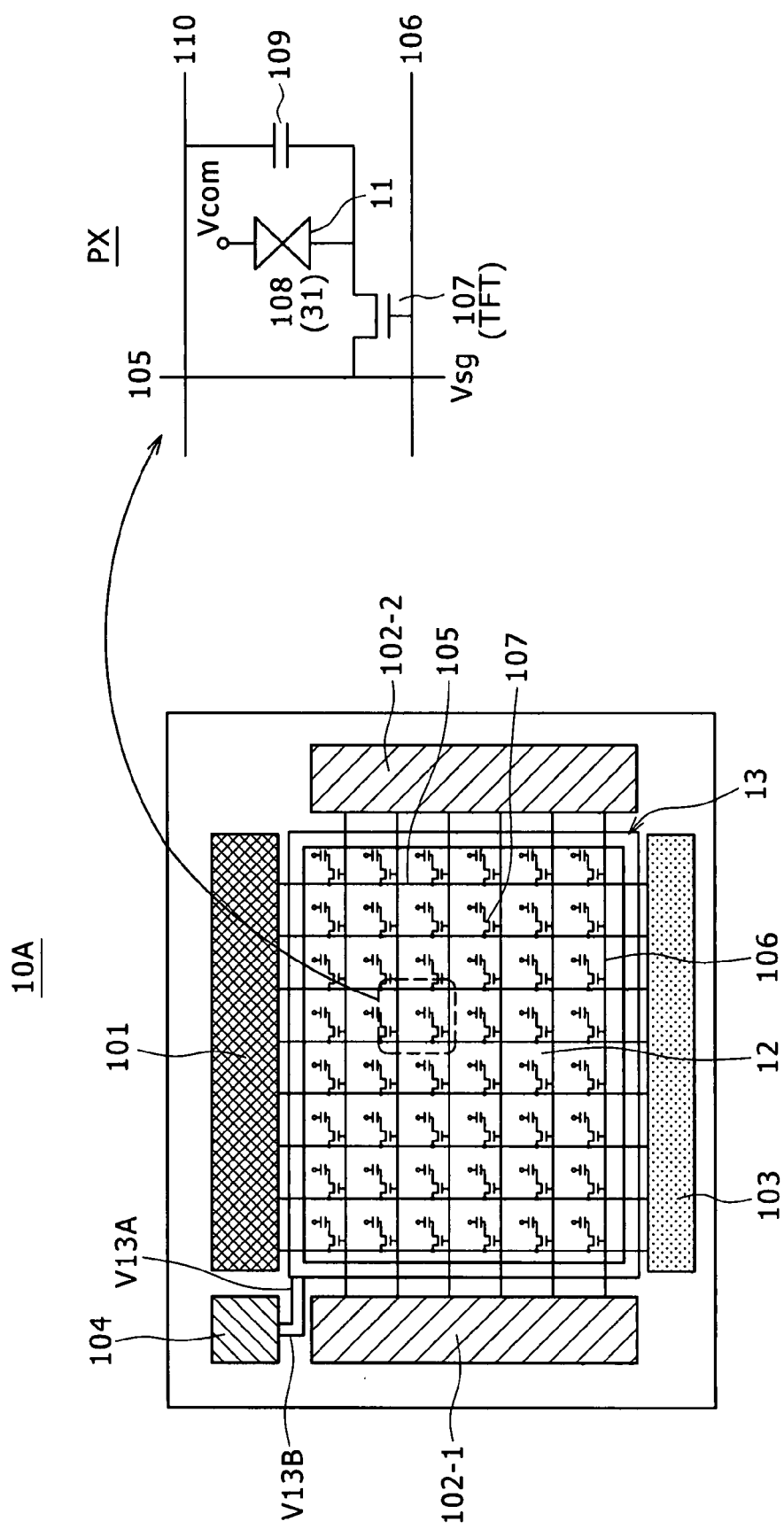
FIG. 5 is a diagram showing an example of an arrangement in an array substrate (liquid crystal panel part) of an active matrix type liquid crystal display element according to the present embodiment.

FIG. 5 is a diagram showing an example of an arrangement of circuit elements in the TFT substrate (liquid crystal panel part) of the active matrix type liquid crystal display device according to the present embodiment.

As shown in FIG. 5, the TFT substrate 10A includes a horizontal transfer circuit 101, vertical transfer circuits 102-1 and 102-2, a precharge circuit 103, and a voltage controlling circuit 104 in a peripheral part surrounding the effective pixel area 12 in which pixels are arranged in the form of an array and the peripheral area 13.

The effective pixel area 12 has a plurality of data lines 105 and a plurality of scanning lines (gate wiring) 106 arranged in the form of a grid. One end side of each of the data lines 105 is connected to the horizontal transfer circuit 101, and another end side of each of the data lines 105 is connected to the precharge circuit 103. End parts of each of the scanning lines 106 are connected to the vertical transfer circuits 102-1 and 102-2, respectively.

Each of a plurality of pixels PX formed in the form of a matrix to constitute the effective pixel area 12 of the TFT substrate 10A has a pixel switching thin film transistor (TFT) 107 for performing switching control, a liquid crystal 108 (31), and an auxiliary capacitance (storage capacitance) 109.

A data line 105 supplied with a pixel signal is electrically connected to the source of a transistor 107 to supply the pixel signal Vsig to be written. A scanning line 106 is electrically connected to the gate of the transistor 107. A pulse-like scanning signal is applied to the scanning line 106 in predetermined timing.

A pixel electrode 11 is electrically connected to the drain of the transistor 107. The transistor 107 as a switching element is turned on for a certain period, whereby the pixel signal Vsig supplied from the data line 105 is written in predetermined timing.

The pixel signal having a predetermined level which signal is written to the liquid crystal 108 via the pixel electrode 11 is retained for a certain period between the pixel electrode 11 and the common (counter) electrode 21 formed on the counter substrate 20. The alignment or order of a set of molecules of the liquid crystal 108 changes according to the level of the voltage applied to the liquid crystal 108. The liquid crystal 108 thereby modulates light, and thus enables gradation display.

Incident light is allowed to pass through this liquid crystal part according to the applied voltage, and light having a contrast corresponding to the pixel signal is emitted from the liquid crystal display element as a whole.

In this case, in order to prevent a leakage of the retained pixel signal, the auxiliary capacitance (storage capacitance) 109 is added in parallel with a liquid crystal capacitance formed between the pixel electrode and the counter electrode. Thereby, a retaining characteristic is further improved, and a liquid crystal display element having a high contrast ratio can be realized.

In addition, to form such a retaining capacitance (storage capacitance) 109, common wiring 110 made into a resistance is provided.

In the present embodiment, the voltage controlling circuit 104 supplies the voltage V13A to be applied to the first peripheral electrode 13A formed in the above-described peripheral area 13 and the voltage V13B to be applied to the second peripheral electrode 13B such that the voltage V13A and the voltage V13B are opposite from each other in phase (or polarity).

The liquid crystal display device 1 according to the present embodiment is for example formed as an active matrix type liquid crystal display element performing frame inversion driving in which a voltage applied to each pixel electrode is inverted with reference to a counter electrode voltage in each frame.

Figure 6:
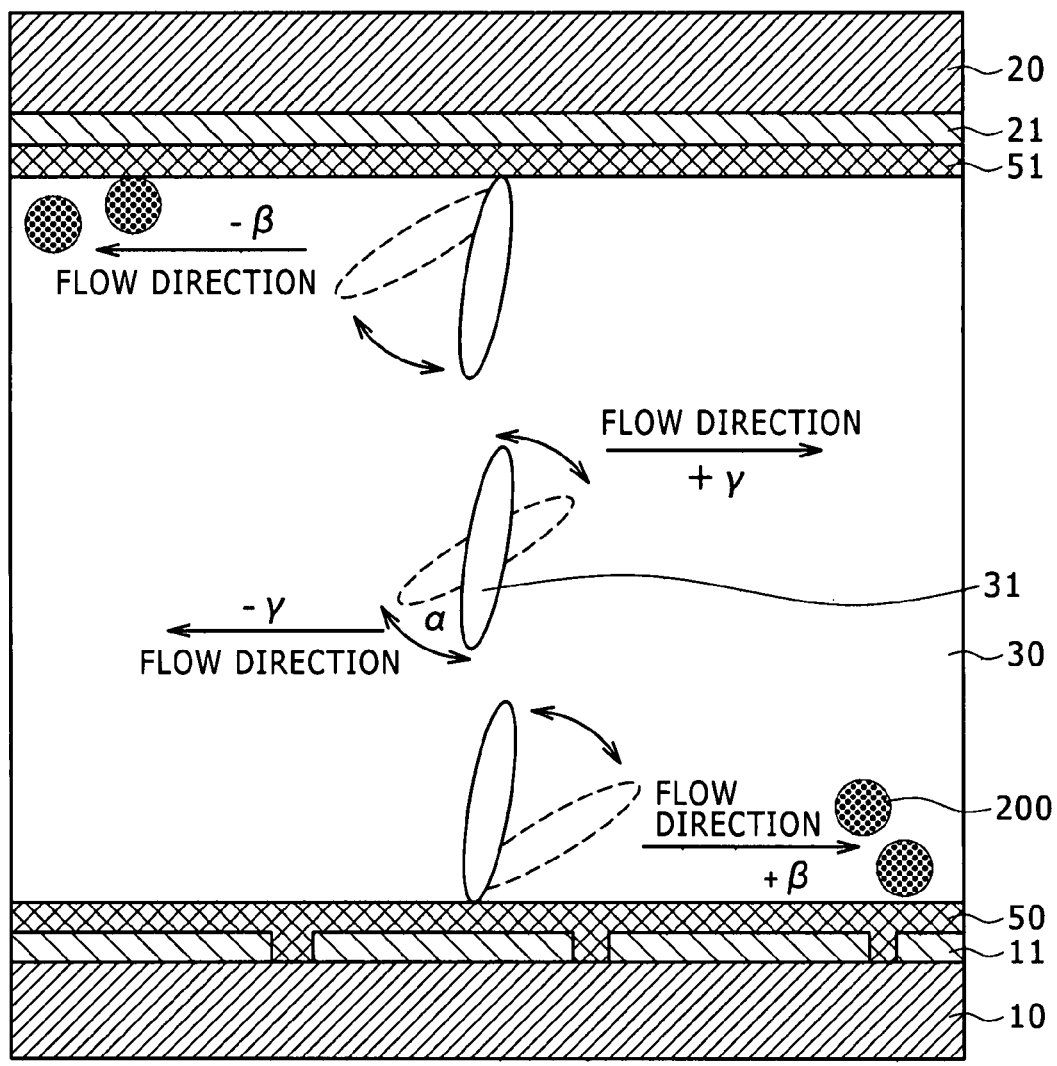
FIG. 6 is a sectional view of the liquid crystal display device, the sectional view being of assistance in explaining a phenomenon that occurs due to effect of an ionic impurity.

Prior to the description of the constitution and driving of the liquid crystal display device 1 according to the present embodiment, movement of an impurity in the liquid crystal layer will be described with reference to FIGS. 6 to 9. FIG. 6 shows liquid crystal molecules in a state of anti-parallel alignment as viewed directly from one side for simplicity.

A voltage applied to the liquid crystal layer 30 is an alternating voltage, and thus the polarity of the voltage is reversed to be a positive polarity or a negative polarity in each period of one frame. In response to the alternating waveform, the alignment in a polar angle direction of the liquid crystal molecules is slightly swayed, and the speed of the sway is different between an inclining direction and a relaxing direction ($\alpha$ in FIG. 6).

Then, a minute flow occurs in the liquid crystal layer 30. In an intermediate layer of the liquid crystal layer 30, a sway occurs with the center of gravity of the liquid crystal molecules as a rotation axis. Therefore, minute flows (+$\gamma$ and −$\gamma$ in FIG. 6) cancel each other out and do not constitute a force that moves impurity ions.

On the other hand, at interfaces between the liquid crystal layer and the substrates 10 and 20 opposed to each other (the inorganic alignment film 50 and 51), one end of a molecular chain of liquid crystal molecules is fixed to the alignment film. Therefore the molecular chain is swayed on a point of contact with the alignment film, and a minute flow appears in a direction of alignment of the liquid crystal 31 (+$\beta$ and −$\beta$ in FIG. 6).

This flow on the side of one of the substrates 10 and 20 opposed to each other is in an opposite direction from a flow on the side of the other substrate, and is thus cancelled out as a whole. However, this flow is a minute flow in one direction at the interface, and thus moves impurity ions. Hence, impurity ions move in a direction parallel to an alignment orientation of the liquid crystal 31. Such a phenomenon is described in Patent Document 11).

Figure 7:
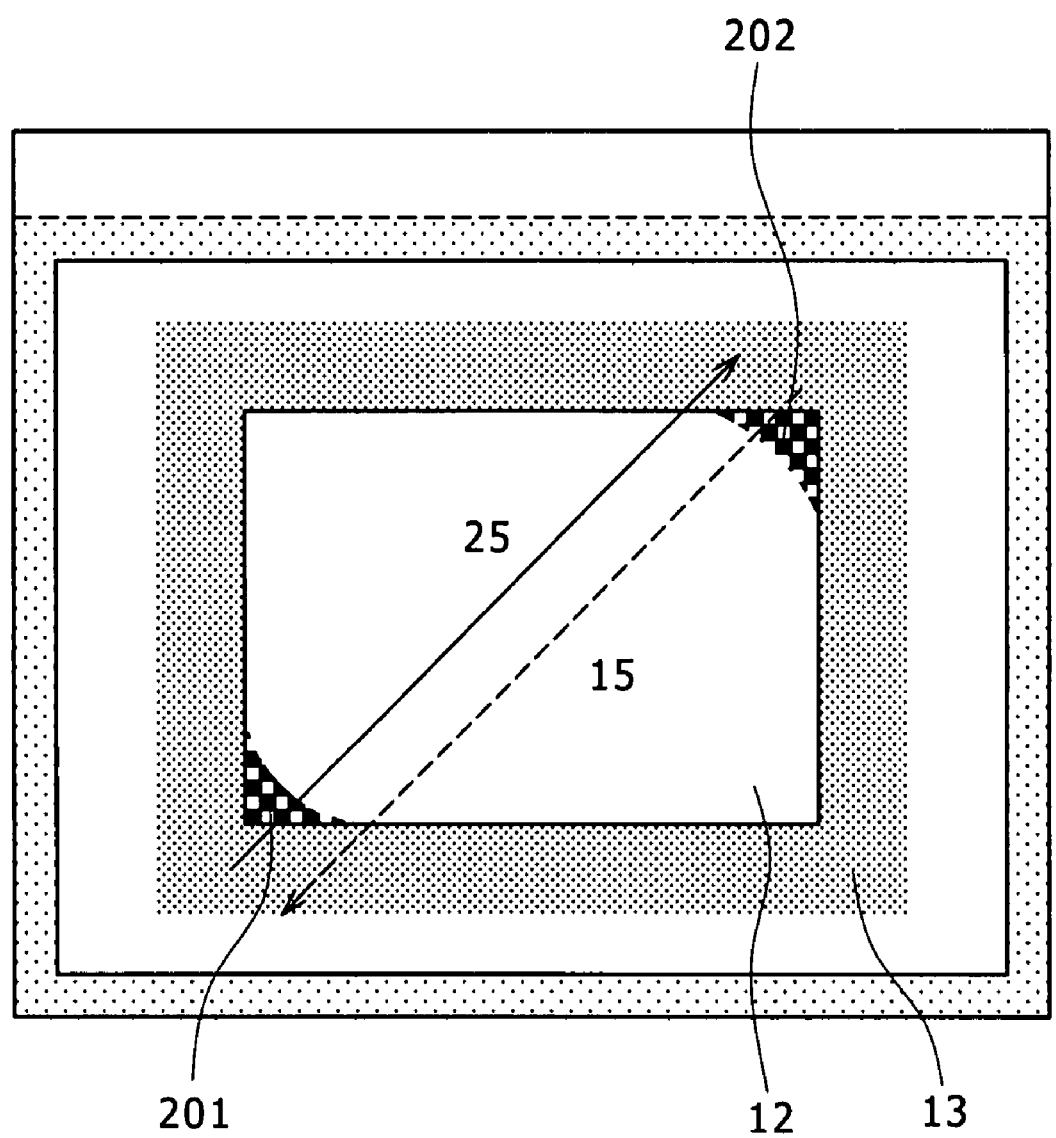
FIG. 7 is a plan view of the liquid crystal display device, the plan view being of assistance in explaining the phenomenon that occurs due to the effect of the ionic impurity.

FIG. 7 is a diagram of assistance in explaining a state of the phenomenon.

In FIG. 7, reference numeral 25 denotes an alignment vector indicating the alignment orientation of the liquid crystal on the counter substrate 20, and reference numeral 15 denotes an alignment vector indicating the alignment orientation of the liquid crystal on the TFT substrate 10. Impurities 200 at each substrate interface each moves along the direction of the vector at the substrate.

In this case, the impurities 200 are observed as display variations at positions indicated by reference numerals 201 and 202 in FIG. 7. It is known that this is caused by decreases in voltage actually applied to the liquid crystal as a result of the impurities leaking a voltage of the pixel electrodes. (Black display variations occur in a case of a normally black mode, and white display variations occur in a case of a normally white mode.)

Figure 8:
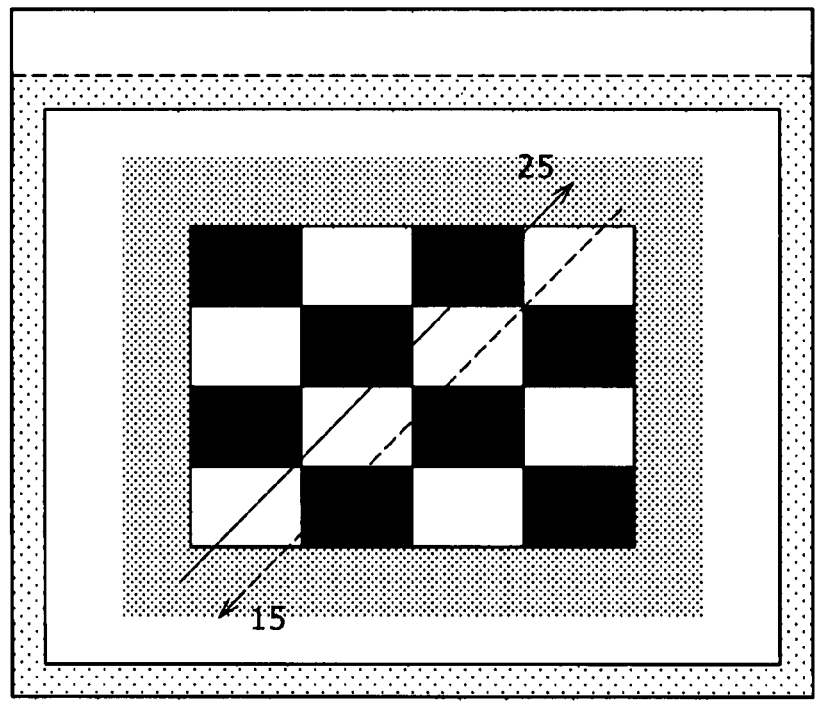
FIG. 8 is a diagram showing a state of the impurity when a checker pattern is displayed continuously.
Figure 9:
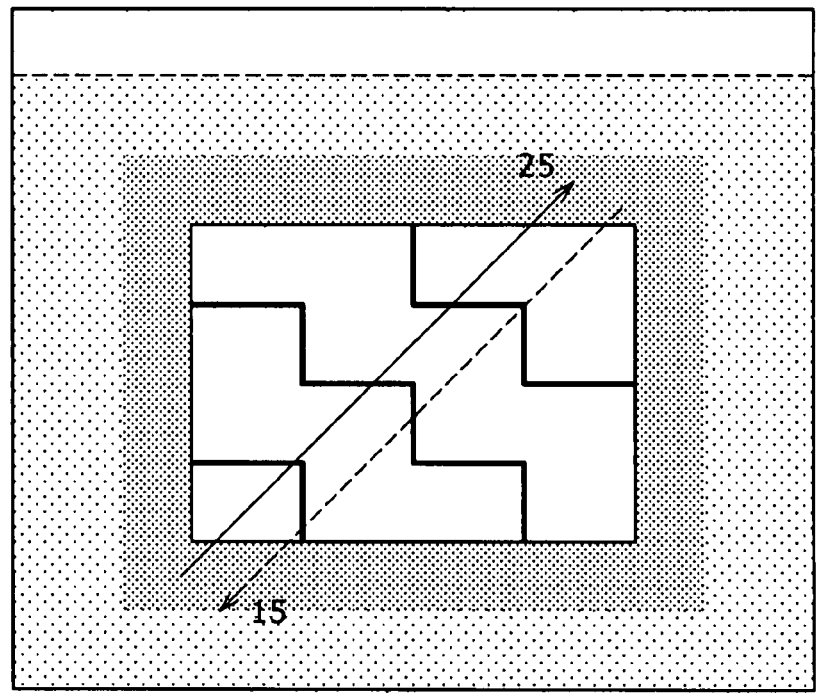
FIG. 9 is a diagram of assistance in explaining movement of impurity ions in a case of a normally black mode in which white display is made by voltage application.

FIG. 8 and FIG. 9 show a state of impurities when a checker pattern is displayed continuously.

Description will now be made of movement of impurity ions in the case of the normally black mode in which white display is made by voltage application.

FIG. 8 shows the displayed checker pattern and the alignment vectors of the substrates. When a uniform image is displayed after the display in FIG. 8 is continued for a while, traces in the shape of lines, or a so-called burn-in phenomenon is observed at edge parts of areas where white has been displayed in FIG. 8, that is, areas where a high voltage has been applied, as shown in FIG. 9.

This phenomenon indicates that because the liquid crystal is swayed relatively greatly and a flow at a substrate interface is rapid in the parts where the high voltage is applied (white) as compared with parts where a low voltage is applied (black), impurity ions within the white display areas move along the alignment vector and then stay at edges of black display areas having a slow flow.

After this state (uniform display) is continued for a while, a uniform flow moves and diffuses the impurities, so that the traces in the shape of lines are eliminated.

In FIG. 9, the burn-in phenomenon appears in the direction of the liquid crystal alignment vector 25 of the counter electrode because a weak direct-current component is superimposed on the alternating waveform and applied to the liquid crystal layer in the display state of FIG. 8, and thus-impurity ions adhere to the one-side substrate according to the polarity of the impurity ions.

It is known that such a burn-in phenomenon can be observed when an alignment film of an organic material is used, but appears more noticeably when an alignment film of an inorganic material is used (for example Patent Document 12).

As described above, the impurity ions 200 within the liquid crystal layer 30 move in parallel with the alignment orientation of the liquid crystal near the substrate interface, and increase the moving speed with increase in voltage. Further, the impurity ions 200 also move along the direction of an electric field, and are adsorbed on the alignment film when there is a direct-current electric field component.

The present embodiment has been devised using this phenomenon. Returning to FIG. 3 and FIG. 4, the description of the present embodiment will be made again.

First, in the present embodiment, a plurality of electrodes 13A and 13B are disposed so as to be adjacent to each other in the peripheral area 13, so that potential between the adjacent electrodes is changed.

Thereby an electric field in a horizontal direction occurs, constituting a force that moves impurity ions in addition to a flow caused by the minute sway of the liquid crystal, so that ions moving from the pixel area 12 can be swiftly moved to the outside of the pixel area 12.

Further, voltages applied to the peripheral electrodes 13A and 13B are made higher than that of the pixel area 12. Thereby the flow caused by the minute sway of the liquid crystal becomes rapid, so that ions can be moved to the outside of the pixel area 12 more swiftly than in the above case.

Further, by interchanging the potentials of the adjacent electrodes periodically, it is possible to move impurity ions to the outside of the pixel area continuously without stopping the flow of the impurity ions in the peripheral area.

Further, shortening the period (increasing frequency) can make the moving speed of the impurity ions higher than in the above case.

As a peripheral electrode structure for realizing the above without making a substantial change in circuitry, a comb tooth-shaped electrode structure in FIG. 3 is adopted on the TFT substrate 10 side in the present embodiment.

An example of experiment in the present embodiment will next be described.

Three standards for the peripheral electrode structure and a driving method thereof were prepared. The checker pattern in FIG. 8 was displayed after continuous driving for a certain time, and checks were made for the burn-in phenomenon. Samples used were fabricated as follows.

Three kinds of peripheral electrode structures were prepared: no peripheral electrode (none), one uniform electrode (solid), and comb-tooth electrodes of the present embodiment. A gap of 1.0 μm was provided between pixel electrodes and comb-tooth peripheral electrodes.

A glass substrate to which a transparent conductive film formed by a uniform ITO film was attached as an electrode was used as a counter electrode. Alignment films made of an inorganic material were formed on the electrode surfaces of the counter electrode and the TFT substrate by oblique evaporation of $SiO_2$. The alignment films were laid one over the other substantially in parallel with each other via a seal material and then fixed.

A material with negative dielectric anisotropy was used for the liquid crystal. The liquid crystal was introduced between the substrates by a vacuum injection method, and then vertically aligned by the alignment films. An injection opening was sealed by the curing of a UV curing resin. Heat treatment was performed at a temperature exceeding an N-I point, and thus a realignment process was performed. An FPC was joined to a terminal part. Thereby a liquid crystal display device in the normally black mode was produced.

In the experiment, continuous operation was first performed under the following operating conditions.

Operating Temperature: 55° C., Operating Voltage: ±5 V, Driving Frequency: 120 Hz, Peripheral Electrode Voltage: ±7.5 V, and Peripheral Electrode Frequency: 120 Hz. Waveforms opposite from each other in polarity were applied to adjacent electrodes in the comb-tooth electrodes formed by the first peripheral electrode and the second peripheral electrode (FIG. 4B and FIG. 4C). The continuous operation was performed for a predetermined time.

Then, evaluation was performed by the following method.

Operating Temperature: 55° C., Driving Frequency: 120 Hz, Peripheral Electrode Voltage: ±7.5 V, and Peripheral Electrode Frequency: 120 Hz. A uniform screen display with 2 V was made after the checker pattern (FIG. 8) with ±5 V (white) and ±1 V (black) was displayed for one hour in a state of the waveforms opposite from each other in polarity being applied to the adjacent electrodes in the comb-tooth electrodes. Using a projection type video display device in a dark room, enlargement and projection was performed with green light, and a visual check was made.

A result of the above-described experiment is shown in Table 1.

TABLE 1

|      | None | Peripheral Solid | One-Line Comb Teeth |
|------|------|------------------|---------------------|
| 0    | A    | A                | A                   |
| 96   | A    | B                | B                   |
| 192  | A    | B                | B                   |
| 288  | B    | B                | B                   |
| 384  | B    | B                | B                   |
| 480  | B    | C                | A                   |
| 576  | C    | C                | A                   |
| 768  | C    | C                | A                   |
| 960  | C    | C                | A                   |
| 1152 | D    | C                | A                   |
| 1536 | D    | C                | A                   |
| 1920 | D    | C                | A                   |
| 2304 | D    | C                | A                   |

A: No burn-in
B: Slight burn-in
C: Burn-in occurs, but disappears immediately
D: Severe burn-in Without peripheral electrodes, burn-in becomes severe after about 1000 hours. With the solid electrode installed, burn-in disappears immediately even after 2000 hours. Therefore an improvement in the preceding example can be confirmed. However, it may not be said positively that the improvement is sufficient for practical use.

On the other hand, in the case of a sample in which the comb-tooth electrodes of the present embodiment are installed, burn-in was not observed even after more than 2000 hours, and thus very excellent display was obtained.

Describing this from a viewpoint of movement of ions, without a peripheral electrode, impurity ions in the pixel area aggregate at one part as shown in FIG. 7 due to a flow caused by liquid crystal driving, thus resulting in severe burn-in. When the solid electrode is provided, impurity ions continuously move from the pixel area to the peripheral area and do not aggregate as shown in FIG. 7, so that burn-in is alleviated.

In the present embodiment provided with the comb-tooth electrodes, the peripheral area has a high sweeping-out capability, and is thus able to actively sweep out impurity ions in the pixel area. Thus, impurities in the pixel area can be swept out without the impurity ions staying in the pixel area, so that excellent display free from burn-in is obtained.

EXAMPLES OF MODIFICATION

In the present embodiment, the TFT substrate 10 is a transparent substrate. However, the TFT substrate 10 may be formed as a reflection substrate on which reflection type pixel electrodes are arranged, using a silicon (Si) substrate.

In addition, in the constitution of FIG. 2, an example is shown in which a plurality of peripheral electrodes 13A and 13B adjacent to each other are provided in the peripheral area 13 of the TFT substrate 10 as a first substrate. However, as shown in FIG. 10, for example, a second electrode part EL2A can be formed on the side of the counter substrate 20 as a second substrate by providing a common electrode (pixel electrode part) 21A in the pixel area 12 and a plurality of peripheral electrodes 21B and 21C adjacent to each other in the peripheral area 13 as in the case of the TFT substrate 10 in place of the common electrode.

In this case, driving voltage is applied to the peripheral electrodes 21B and 21C in the same manner as the driving voltage applied to the peripheral electrodes 13A and 13B of the first electrode part EL1.

Figure 10:
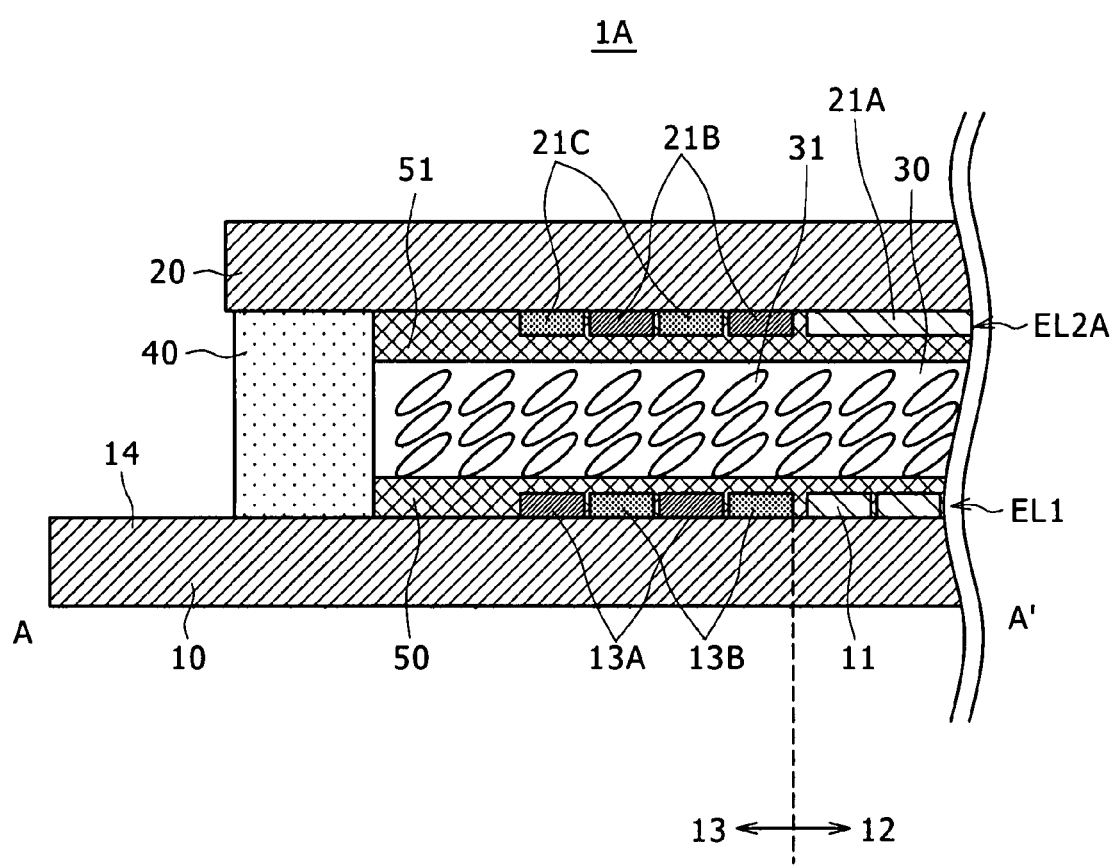
FIG. 10 is a sectional view of a liquid crystal display device according to another embodiment.

The example of FIG. 10 can provide similar effects to those of the constitution of FIG. 2.

Figure 11:
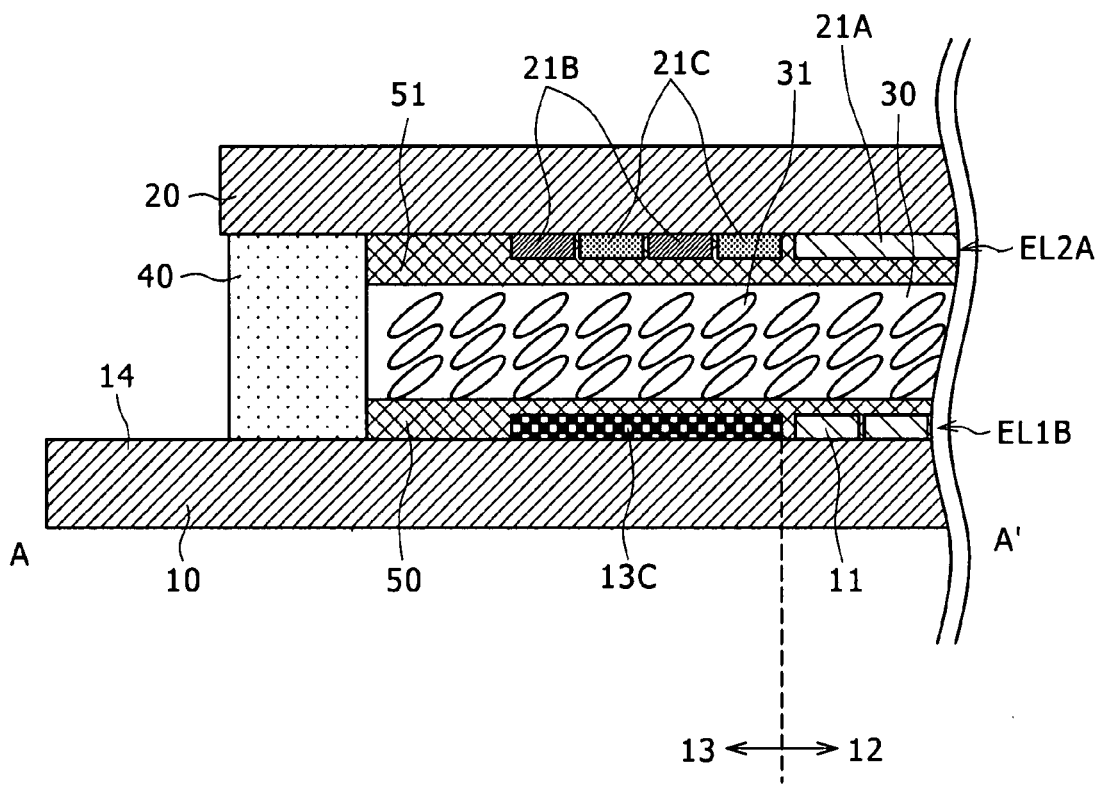
FIG. 11 is a sectional view of a liquid crystal display device according to yet another embodiment.

Further, instead of the constitution of FIG. 10, as shown in FIG. 11, a peripheral electrode forming a first electrode part EL1B on the TFT substrate 10 as first substrate can be formed by a single electrode 13C.

Figure 12:
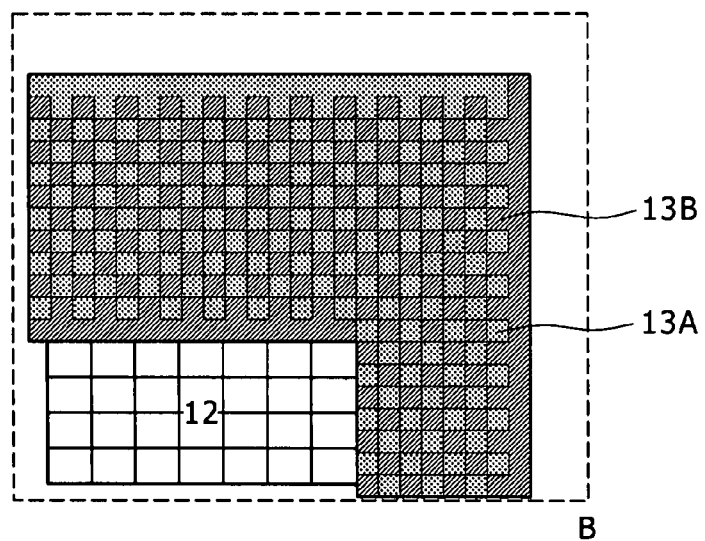
FIG. 12 is a diagram showing another form (checker form) of a plurality of peripheral electrodes.

In addition, in the present embodiment, the shape of the peripheral electrodes is a comb-tooth shape. However, a checker shape as shown in FIG. 12, for example, can be adopted.

A constitution of a projection type liquid crystal display device as an example of an electronic device using the above-described liquid crystal display element will next be described with reference to a schematic constitution diagram of FIG. 13.

[Projection Type Display Device]

Figure 13:
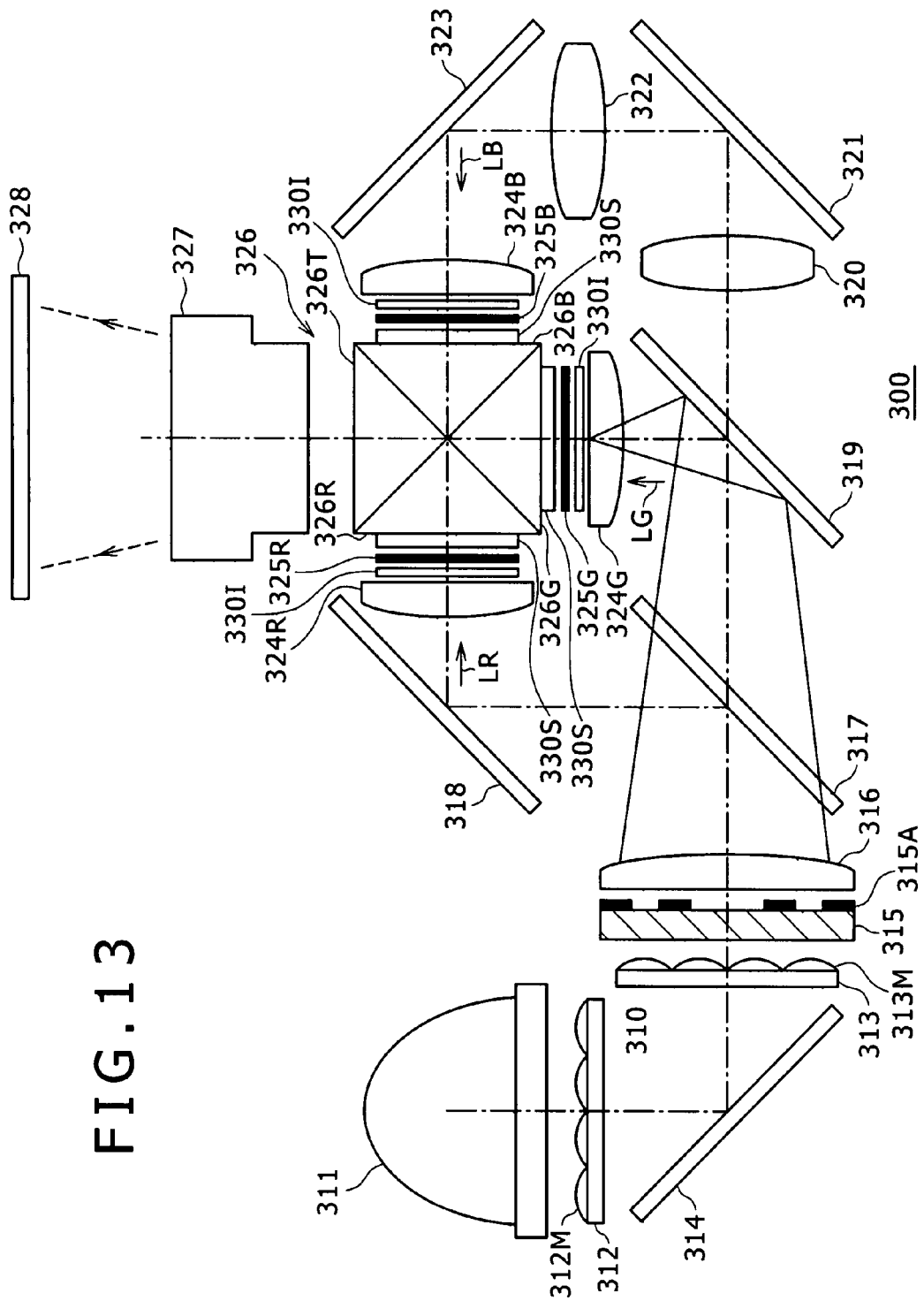
FIG. 13 is a configuration diagram showing a more concrete example of a three-panel type projection type liquid crystal display device according to the present embodiment.

The liquid crystal display device as shown in FIG. 1 is for example used in a projection type liquid crystal projector as shown in FIG. 13.

The liquid crystal projector 300 shown in FIG. 13 is a so-called three-panel type projector that separates light from a light source into three primary colors of red, blue, and green, and makes color image display using one liquid crystal display panel for each of the colors.

The liquid crystal display panels corresponding to the respective colors each correspond to the liquid crystal display device described with reference to FIG. 1. The three liquid crystal display panels have substantially the same structure.

In the following, for convenience, the liquid crystal display device which the red light enters will be referred to as a liquid crystal display device 325R. The liquid crystal display device which the green light enters will be referred to as a liquid crystal display device 325G. The liquid crystal display device which the blue light enters will be referred to as a liquid crystal display device 325B.

The liquid crystal projector 300 shown in FIG. 13 includes: a light source 311 for emitting light; a first lens array 312 disposed on a side where the light from the light source 311 is emitted; a mirror 314 for reflecting the light emitted from the first lens array 312 and thereby changing an optical path (optical axis 310) of the emitted light by 90°; and a second lens array 313 that the light reflected from the mirror 314 enters.

The mirror 314 is preferably a total reflection mirror.

A plurality of microlenses 312M and 313M are two-dimensionally arranged on the first lens array 312 and the second lens array 313, respectively. The first lens array 312 and the second lens array 313 are to make the illumination distribution of the light uniform, and have a function of dividing the incident light into a plurality of luminous fluxes.

Incidentally, a UV (Ultra Violet)/IR (Infrared) cut filter not shown in the figure may be provided between the light source 311 and the first lens array 312.

The light source 311 emits white light including red light, blue light, and green light that are necessary for color image display. The light source 311 includes a luminous body (not shown) for emitting the white light, and a reflector for reflecting and condensing the light emitted from the luminous body.

A lamp such for example as a super-high pressure mercury lamp, a halogen lamp, a metal halide lamp, or a xenon lamp is used as the luminous body. The reflector is desirably of a shape having a good condensing efficiency, and is for example of a concave shape having rotational symmetry such as an ellipsoid of revolution or a paraboloid of revolution. A luminous point of the luminous body is disposed at a focal position of the reflector of the concave shape.

The white light emitted from the luminous body of the light source 311 is converted into substantially collimated light, then passed through the first lens array 312, and enters the total reflection mirror 314. The white light whose optical axis 310 is bent by 90° by the total reflection mirror 314 enters the second lens array 313.

The liquid crystal projector 300 illustrated in FIG. 13 has a PS synthesizing element 315, a condenser lens 316, and a dichroic mirror 317 on a side where the light from the second lens array 313 is emitted.

The PS synthesizing element 315 has a plurality of retardation films 315A at positions corresponding to positions between adjacent microlenses on the second lens array 313. A half-wave plate is an example of a retardation film 315A.

The PS synthesizing element 315 separates the incident light into polarized light of a P-polarized light component and an S-polarized light component. In addition, the PS synthesizing element 315 emits one of the two separate pieces of polarized light from the polarization changing element 315 while retaining the direction of polarization of the polarized light (for example the P-polarized light). The PS synthesizing element 315 converts the other piece of polarized light (for example the S-polarized light component) into another polarized light component (for example a P-polarized light component) by the action of the half-wave plates 315A, and emits the polarized light component.

The light emitted from the PS synthesizing element 315 is condensed by the condenser lens 316, and then enters the dichroic mirror 317.

The dichroic mirror 317 reflects for example the red light LR of the incident light and transmits light of other colors. The dichroic mirror 317 thereby performs color separation of the incident light into the red light LR and the other colors.

The liquid crystal projector 300 further includes a mirror 318, a field lens 324R, an incidence side polarizing plate 330I, the liquid crystal display device 325R, and an emission side polarizing plate 330S along an optical path of the red light LR resulting from the color separation by the dichroic mirror 317.

A total reflection mirror is preferably used as the mirror 318. The total reflection mirror 318 reflects the red light LR resulting from the color separation by the dichroic mirror 317 toward the incidence side polarizing plate 330I and the liquid crystal display device 325R.

As described above, the incidence side polarizing plate 330I transmits light in a direction coinciding with a polarization axis 330a, the light being included in the red light LR entering the incidence side polarizing plate 330I from the total reflection mirror 318.

The liquid crystal display device 325R has the same structure as the liquid crystal display device illustrated in FIG. 1, as described above. The liquid crystal display device 325R spatially modulates the red light LR entering the liquid crystal display device 325R via the incidence side polarizing plate 330I according to input image data.

The emission side polarizing plate 330S transmits light in a direction coinciding with a polarization axis 330b, the light being included in the modulated red light LR from the liquid crystal display device 325R.

The liquid crystal projector 300 has a dichroic mirror 319 along an optical path of the light of the other colors resulting from the color separation by the dichroic mirror 317. The dichroic mirror 319 reflects for example the green light LG of the incident light and transmits the blue light LB of the incident light. The dichroic mirror 319 thereby performs color separation of the incident light into the green light LG and the blue light LB.

A field lens 324G, an incidence side polarizing plate 330I, the liquid crystal display device 325G, and an emission side polarizing plate 330S are provided in an optical path of the green light LG resulting from the color separation by the dichroic mirror 319.

The incidence side polarizing plate 330I transmits light in a direction coinciding with a polarization axis 330a, the light being included in the green light LG entering the incidence side polarizing plate 330I from the dichroic mirror 319.

The liquid crystal display device 325G spatially modulates the green light LG entering the liquid crystal display device 325G via the incidence side polarizing plate 330I according to input image data.

The emission side polarizing plate 330S transmits light in a direction coinciding with a polarization axis 330b, the light being included in the modulated green light LG from the liquid crystal display device 325G.

Further, a relay lens 320, a mirror 321, a relay lens 322, a mirror 323, a field lens 324B, an incidence side polarizing plate 330I, the liquid crystal display device 325B, and an emission side polarizing plate 330S are provided along an optical path of the blue light LB resulting from the color separation by the dichroic mirror 319.

The mirrors 321 and 323 are preferably a total reflection mirror. The total reflection mirror 321 reflects the blue light LB entering the total reflection mirror 321 via the relay lens 320 toward the total reflection mirror 323. The total reflection mirror 323 reflects the blue light LB reflected by the total reflection mirror 321 and entering the total reflection mirror 323 via the relay lens 322 toward the incidence side polarizing plate 330I and the liquid crystal display device 325B.

The incidence side polarizing plate 330I transmits light in a direction coinciding with a polarization axis 330a, the light being included in the blue light LB entering the incidence side polarizing plate 330I from the total reflection mirror 323.

The liquid crystal display device 325B spatially modulates the blue light LB reflected by the total reflection mirror 323 and entering the liquid crystal display device 325B via the field lens 324B and the incidence side polarizing plate 330I according to input image data.

The emission side polarizing plate 330S transmits light in a direction coinciding with a polarization axis 330b, the light being included in the modulated blue light LB from the liquid crystal display device 325B. A cross prism 326 having a function of synthesizing the red light LR, the green light LG, and the blue light LB is placed at a position where the optical paths of the three pieces of color light intersect each other.

The cross prism 326 is for example formed by joining together four right-angle prisms respectively having incidence surfaces 326R, 326G, and 326B that the red light LR, the green light LG, and the blue light LB enter and an emission surface 326T from which light obtained by synthesizing the red light LR, the green light LG, and the blue light LB is emitted.

In the liquid crystal projector 300, the joining surfaces of the right-angle prisms are coated with dichroic film so that the green light LG entering the cross prism 326 is transmitted toward the emission surface 326T side and the red light LR and the blue light LB entering the cross prism 326 is reflected toward the emission surface 326T side.

Thus, the cross prism 326 synthesizes the three pieces of color light incident on the incidence surfaces 326R, 326G, and 326B, and emits the resulting light from the emission surface 326T.

In addition, the liquid crystal projector 300 has a projection lens 327 for projecting the synthesized light emitted from the cross prism 326 onto a screen 328. The projection lens 327 preferably includes a plurality of lenses, and has a zoom function for adjusting the size of an image projected on the screen 328 and a focusing function.

It is to be noted that the present invention provides the above-described effects when applied not only to a projection type liquid crystal display element but also to either of a reflection type liquid crystal display element and an LCOS device.

In addition, the above-described effects can be expected when the present invention is applied to any of a liquid crystal display element of a built-in drive type, a liquid crystal display element of a type with an external driving circuit, liquid crystal display elements of various sizes ranging from one inch to about 15 inches or larger diagonally, and liquid crystal display elements of a simple matrix type, a TFD active matrix type, a passive matrix driving type, an optical rotation mode, a birefringence mode and the like.

As described above, the liquid crystal display device according to the present embodiment includes: a TFT substrate (first substrate) 10; a counter substrate (second substrate) 20 disposed so as to face the TFT substrate 10 with a predetermined gap between the counter substrate 20 and the TFT substrate 10; inorganic alignment films 50 and 51 formed on respective surfaces opposed to each other of the TFT substrate 10 and the counter substrate 20; a liquid crystal layer 30 retained including a pixel area 12. The liquid crystal display device according to the present embodiment further includes a peripheral area 13 within the gap between the TFT substrate 10 and the counter substrate 20; a first electrode part EL1 formed on the TFT substrate 10; and a second electrode part EL2 formed on the counter substrate 20. The first electrode part EL1 includes a pixel electrode 11 formed in the pixel area 12 and a peripheral electrode (13A and 13B (or 13C)) formed in the peripheral area 13. The second electrode part EL2 includes a pixel electrode part 21(A) formed in the pixel area 12 and a peripheral electrode 21 (21B and 21C) formed in the peripheral area 13, the peripheral electrode of at least one of the first electrode part EL1 and the second electrode part EL2 is formed by a plurality of electrodes adjacent to each other, and voltage values of driving voltages applied to the respective electrodes adjacent to each other of the peripheral electrode are different from each other. Thus, the following effects can be obtained.

Even when an inorganic material is used as alignment film, it is possible to prevent burn-in caused by impurity ions.

In addition, it is possible to manufacture a high-quality liquid crystal display device without inviting an increase in manufacturing cost due to a substantial change in driving circuitry.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
a first substrate including a pixel area and a peripheral area around said pixel area;
a second substrate disposed so as to face said first substrate with a predetermined gap between said first substrate and said second substrate;
a liquid crystal layer retained within the gap between said first substrate and said second substrate;
a first electrode part formed on said first substrate; and
a second electrode part formed on said second, substrate,
wherein said first electrode part includes a pixel electrode formed in said pixel area and there is a first substrate peripheral electrode formed in said peripheral area,
said second electrode part includes a pixel electrode part formed in said pixel area and there is a second substrate peripheral electrode formed in said peripheral area,
the peripheral electrode of at least one of said first electrode part and said second electrode part is formed by a plurality of electrodes adjacent to each other, wherein the first substrate peripheral electrode and the second substrate peripheral electrode are located outside of the pixel area and
voltage values of driving voltages applied to the respective electrodes adjacent to each other of said peripheral electrode are different from each other, and further wherein a phase of signals applied to the pixel electrodes is opposite a phase of signals applied to some of the peripheral electrodes and a peak-to-peak voltage of signals applied to the peripheral electrodes is greater than a peak-to-peak voltage of signals applied to the pixel electrodes.

2. The liquid crystal display device according to claim 1, wherein the pixel electrode part and the peripheral electrode of said second electrode part are connected to each other to form a common electrode.

3. The liquid crystal display device according to claim 1, wherein the peripheral electrode of said first electrode part and the peripheral electrode of said second electrode part are formed by a plurality of electrodes adjacent to each other, and
driving voltages applied to the respective electrodes adjacent to each other of each peripheral electrode are different from each other.

4. The liquid crystal display device according to claim 1, wherein the peripheral electrode of said first electrode part is formed by a single electrode,
the peripheral electrode of said second electrode part is formed by a plurality of electrodes adjacent to each other, and
driving voltages applied to the respective electrodes adjacent to each other of the peripheral electrode of said second electrode part are different from each other.

5. The liquid crystal display device according to claim 1, wherein the voltage values of the driving voltages applied to the respective electrodes adjacent to each other of said peripheral electrode are periodically interchanged.

6. The liquid crystal display device according to claim 5, wherein a voltage value of a driving voltage applied to said peripheral electrode is higher than a voltage value of a driving voltage applied to said pixel electrode.

7. The liquid crystal display device according to claim 6, wherein frequency of the driving voltage applied to said peripheral electrode is higher than frequency of the driving voltage applied to said pixel electrode.

8. The liquid crystal display device according to claim 5, wherein frequency of a driving voltage applied to said peripheral electrode is higher than frequency of a driving voltage applied to said pixel electrode.

9. The liquid crystal display device according to claim 1, wherein a voltage value of a driving voltage applied to said peripheral electrode is higher than a voltage value of a driving voltage applied to said pixel electrode.

10. The liquid crystal display device according to claim 9, wherein frequency of the driving voltage applied to said peripheral electrode is higher than frequency of the driving voltage applied to said pixel electrode.

11. The liquid crystal display device according to claim 1, wherein frequency of a driving voltage applied to said peripheral electrode is higher than frequency of a driving voltage applied to said pixel electrode.

12. The liquid crystal display device according to claim 11, wherein frequency of the driving voltage applied to said peripheral electrode is higher than frequency of the driving voltage applied to said pixel electrode.

13. The liquid crystal display device according to claim 1, wherein an alignment film is formed by an inorganic material on each of opposed surfaces of said first substrate and said second substrate.

14. The liquid crystal display device according to claim 1, wherein said peripheral electrode has a comb-tooth shape.

15. The liquid crystal display device according to claim 1, wherein said peripheral electrode has a checker shape.

16. A liquid crystal display device comprising:
a first substrate including a pixel area and a peripheral area around said pixel area;
a second substrate disposed so as to face said first substrate with a predetermined gap between said first substrate and said second substrate;
a liquid crystal layer retained within the gap between said first substrate and said second substrate;
a pixel electrode formed in said pixel area; and
a peripheral electrode formed in said peripheral area, wherein the peripheral electrode is located outside of the pixel area and
said peripheral electrode is formed by a plurality of electrodes adjacent to each other, and
voltage values of driving voltages applied to the respective electrodes adjacent to each other of said peripheral electrode are different from each other, and wherein a phase of signals applied to the pixel electrodes is opposite a phase of signals applied to some of the peripheral electrodes and a peak-to-peak voltage of signals applied to the peripheral electrodes is greater than a peak-to-peak voltage of signals applied to the pixel electrodes.

17. A video display device comprising:
a light source;
a condensing optical system for leading light emitted from said light source to a liquid crystal display device; and
a projection optical system for enlarging and projecting light resulting from light modulation by said liquid crystal display device;
said liquid crystal display device includes
a first substrate including a pixel area and a peripheral area around said pixel area,
a second substrate disposed so as to face said first substrate with a predetermined gap between said first substrate and said second substrate,
a liquid crystal layer retained within the gap between said first substrate and said second substrate,
a first electrode part formed on said first substrate, and
a second electrode part formed on said second substrate,
wherein said first electrode part includes a pixel electrode formed in said pixel area and there is a first substrate peripheral electrode formed in said peripheral area,
said second electrode part includes a pixel electrode part formed in said pixel area and there is a second substrate peripheral electrode formed in said peripheral area, wherein the first substrate peripheral electrode and the second substrate peripheral electrode are located outside of the pixel area;
the peripheral electrode of at least one of said first substrate peripheral electrode part and said second substrate peripheral electrode part is formed by a plurality of electrodes adjacent to each other, and
voltage values of driving voltages applied to the respective electrodes adjacent to each other of said peripheral electrode are different from each other, and wherein a phase of signals applied to the pixel electrodes is opposite a phase of signals aplied to some of the peripheral electrodes and a peak-to-peak voltage of signals applied to the peripheral electrodes is greater than a peak-to-peak voltage of signals applied to the pixel electrodes.

18. A video display device comprising:
a light source;
at least one liquid crystal display device;
a condensing optical system for leading light emitted from said light source to said liquid crystal display device; and
a projection optical system for enlarging and projecting light resulting from light modulation by said liquid crystal display device,
said liquid crystal display device includes
a first substrate including a pixel area and a peripheral area around said pixel area,
a second substrate disposed so as to face said first substrate with a predetermined gap between said first substrate and said second substrate,
a liquid crystal layer retained within the gap between said first substrate and said second substrate,
a pixel electrode formed in said pixel area, and
a peripheral electrode formed in said peripheral area, wherein the peripheral electrode is located outside of the pixel area and
said peripheral electrode is formed by a plurality of electrodes adjacent to each other, and
voltage values of driving voltages applied to the respective electrodes adjacent to each other of said peripheral electrode are different from each other, and wherein a phase of signals applied to the pixel electrodes is opposite a phase of signals applied to some of the peripheral electrodes and a peak-to-peak voltage of signals applied to the peripheral electrodes is greater than a peak-to-peak voltage of signals applied to the pixel electrodes.

* * * * *